June 1, 1926.
H. M. CHANCE
1,586,609
METHOD AND APPARATUS FOR THICKENING MIXTURES AND CLARIFYING LIQUIDS
Filed July 22, 1925
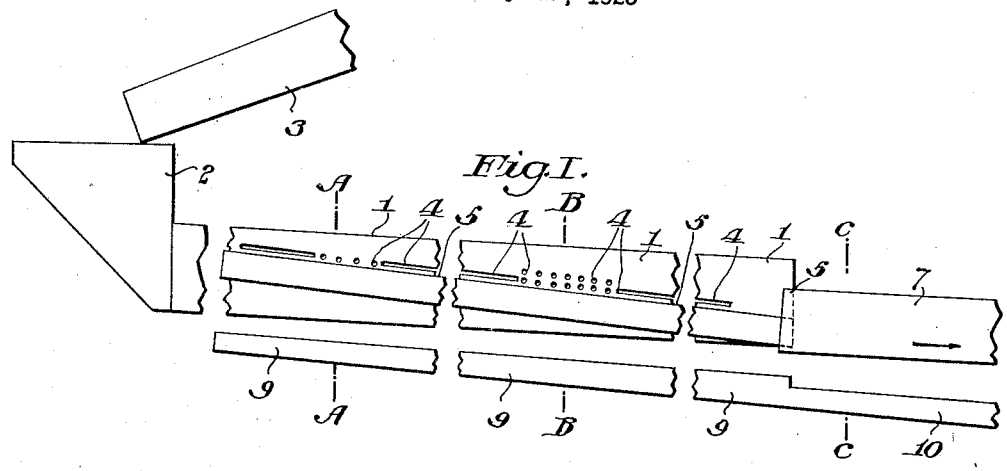
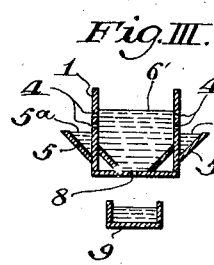 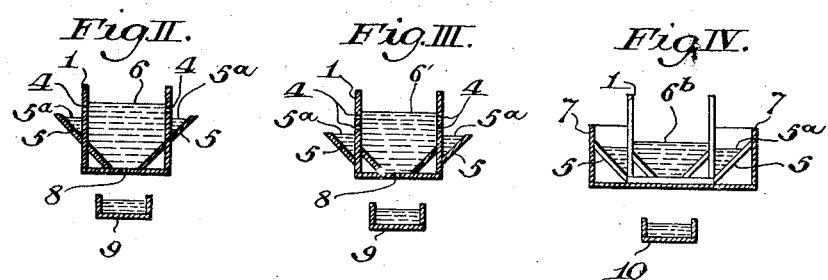 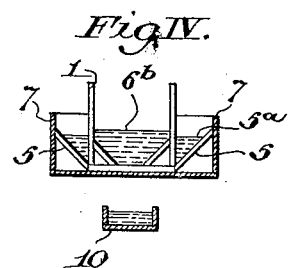
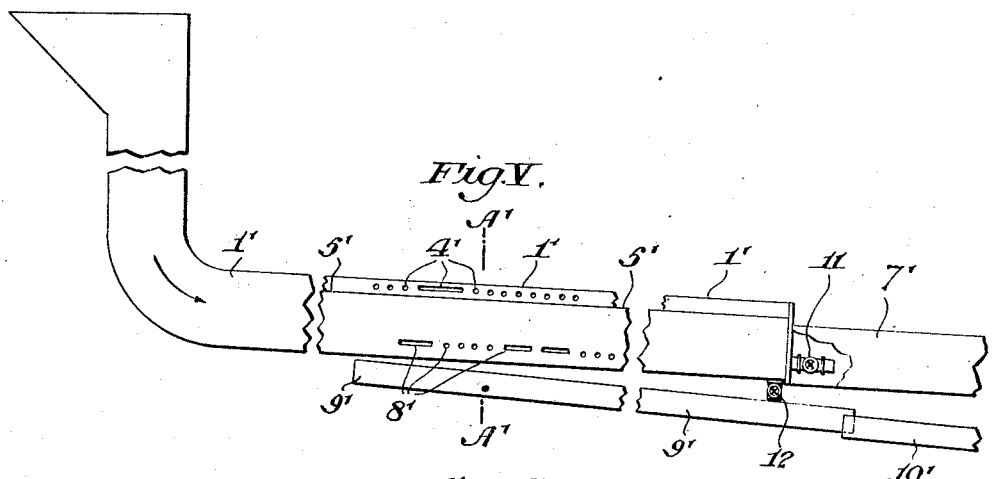
Witnesses:
Carl K. Schulze
Frank H. Mills
Inventor:
Henry M. Chance Patented June 1, 1926.

1,586,609

UNITED STATES PATENT OFFICE.

HENRY M. CHANCE, OF PHILADELPHIA, PENNSYLVANIA.

METHOD AND APPARATUS FOR THICKENING MIXTURES AND CLARIFYING LIQUIDS.

Application filed July 22, 1925. Serial No. 45,231.

My invention relates to the division of fluid mixtures of solids and liquids, such as ore pulps and the like, into a clarified or partially clarified liquid, and a thickened mixture of said solids and liquid. The treatment of such pulps often requires thickening of the pulp, or clarification of some of the water for re-use.

Thickening and clarification are commonly effected by sedimentation in settling tanks of some form. Settlers are also used for classification. Classification incidentally includes concentration by removing the heavier materials separately from the pulp. These latter functions are frequently carried out in troughs through which the pulp is caused to flow, the coarser and heavier material settling to the bottom, and being removed therefrom as a classified and concentrated product.

In my invention I cause the pulp, or other similar material, to flow through a conduit, which may be open or closed and of any suitable cross-sectional shape, at a velocity sufficient to prevent the accumulation of settled material upon the bottom of the conduit, and to keep settling material continuously moving with the moving stream. Falling of the solid matter produces thickening of the material flowing in contact with, or in close proximity to, the bottom of the conduit, that containing the largest percentage of solids and the smallest percentage of water, being the layer in contact with the bottom of the conduit. I effect the removal of this thickened material continuously, and at approximately the same rate at which it is produced, by providing substantially continuous or contiguous longitudinal slot, slots or perforations through which a continuous discharge of such material is maintained, the holes or apertures in or adjacent to the bottom of said conduit, being spaced close together and so distributed over the bottom of said conduit as to effect a continuous discharge of the said thickened product.

The removal of thickened material as quickly as thickening is effected, facilitates the settling of further material by bringing the next layer of partly thickened material in direct contact with the bottom of the trough, where owing to the frictional resistance of the thickened material moving over the bottom of the trough, the velocity of flow is less than in the zone immediately above this thickened layer, this reduction in velocity of travel increasing the rate at which thickening is effected.

The conduit is made long enough to effect thickening of the material to the desired consistency, and corresponding clarification of the water flowing in the upper portion of the conduit. The withdrawal of the thickened product, reduces the volume of material flowing in the conduit, thus progressively decreasing its velocity of flow, and this decrease improves the efficiency of the apparatus as a clarifier by reducing eddy currents and turbulent flow, thus permitting more quiet and effective sedimentation of the finer materials.

After the removal of the thickened product the remaining liquid flowing in the conduit may be discharged therefrom for re-use, or for re-treatment in a similar conduit with lower velocity of flow, or in any other type of clarifier, settler or thickener, if a very high degree of clarification is required.

A further feature of my invention is the continuous removal of the clarified liquid from the top of the moving current of material, by means similar to those described for the removal of the thickened product from the floor of the conduit. When the operation is carried out in an open trough, the clarified liquid is removed by a weir or weirs along the sides of the trough, or by a series of perforations or holes located at or immediately below the top of the moving stream.

The removal of thickened material from the lower part and of clarified liquid from the upper part of the flowing material, progressively reduces the volume of material and thus reduces the velocity of flow, a condition favorable both to sedimentation of the finer particles of solids into a thickened product, and the clarification of the upper portion of the moving stream.

To secure the highest efficiency the material should be fed into the apparatus at a substantially uniform rate. When a closed conduit is used the material will preferably be introduced into the conduit at a uniform rate and at constant pressure. The discharges of thickened product and of clarified liquid should preferably be so restrained as to maintain the moving stream under pressure throughout the whole length of the conduit.

When the conduit is an open trough the velocity of flow will depend upon the inclination of the trough and its width. As the volume of flow is progressively reduced, the width of the trough may be correspondingly decreased, to maintain the same velocity of flow, or the inclination may be reduced to maintain the depth of the moving stream, with corresponding decrease in velocity of flow. All of which will be readily understood by those familiar with the construction and operation of launders as used in ore milling.

In the drawings Fig. I is a vertical elevation of an open conduit in which my invention may be carried out, Figs. II and III are cross-sections showing the construction respectively at the lines A—A and B—B of Fig. I, and Fig. IV is a cross-section and elevation as seen from the line C—C of Fig. I.

Fig. V is a vertical elevation of a modification showing a closed conduit, and Fig. VI is a cross-section of Fig. V illustrating the construction at the line A—A.

In Fig. I, an open conduit or trough is shown by 1 and a feed hopper by 2, 3 is a feed chute, 4, 4 are slots, weirs or holes for the discharge of clarified liquid, the drawing illustrating the use of perforations or slots, 5, 5 are troughs or launders attached to the sides of 1 to receive and deliver clarified liquid issuing through 4, 4. The fluid mixture in 1, and clarified liquid in 5, in Figs. II, III and IV are indicated by broken lines, the top of the flowing mixture in 1 being indicated by 6, 6ª and 6ᵇ and the top of clarified liquid in 5 by 5ª. The clarified liquid in 5, 5 and that shown by 6ª, discharges from 5, 5 and 1 into discharge or delivery launder 7. The arrows indicate the direction of flow.

The bottom of 1 is provided with a slot, slots or perforations 8, similar to the slots or perforations 4, through which the thickened product continuously flows into the launder 9 which carries it into the discharge or delivery launder for thickened product, 10. The thickened product flowing in 9 and 10 is indicated by broken lines. The slots or perforations 8 can be replaced by the perforations of a perforated metal plate providing holes having the area required to effect removal of the volume of thickened product required to be discharged, the floor of 1, diagrammatically representing such perforate plate of metal or other suitable material.

It will be understood that the conduit or trough 1, should be made long enough to permit of the sedimentation and removal through the vents 8, 8, of all of the solids necessary to be removed to secure the nearest approach possible to the desired degree of clarification thus permitting the liquid flowing from the open end of trough 1 to be discharged into the delivery launder 7 and mix with the clarified liquid from launders 5, 5, which also discharges into 7, the clarified liquid being thus available for re-use, or for retreatment in other apparatus, or by other methods, if a higher degree of clarification be necessary or desirable.

In this specification and the claims hereof the terms "clarify", "clarifying", "clarified" and "clarification" are used in a relative sense and are not intended to imply complete removal of solids, thus water used in coal washing or clay washing may be "clarified" by the removal of all solids that readily can be removed by sedimentation and thus be suitable for re-use, although it may be neither transparent, colorless or translucent.

To simplify the drawings supporting structures for the conduits, launders, feed hopper and feed chute are omitted, and bracing to strengthen the structure where weakened by the slots, weirs, holes, etc. has for the same reason not been shown.

The drawings illustrate apparatus of a crude, but cheap and simple type constructed entirely of wood. It may however, be constructed of any material suitable for use in conduits, pipes, flumes, launders and the like.

In Figs. V and VI the conduit 1' is shown as a square box-type pipe, intended diagrammatically to indicate a closed conduit or pipe of any desired cross-sectional shape, 2' is a feed hopper elevated above 1' and thus adopted to feed 1' with the fluid mixture at sufficient pressure to produce the required velocity of flow, 3' is a feed chute. The conduit 1' is provided on its upper portion with slots, round or other perforations. 4' to permit the continuous discharge of clarified liquid, 5', 5' are troughs or launders to receive clarified liquid issuing through 4', 4', and deliver it into discharge or delivery launder 7'. The lower part of 1' is provided with slots or perforations 8' adjacent to the floor of the conduit for the continuous discharge of the thickened product simultaneously with its formation, said discharges emptying into launder 9' which delivers the thickened product into delivery launder 10'. The conduit 1' is closed at its lower end but is provided with valved discharge outlets 11 and 12 whereby clarified liquid (or solids) reaching the end of the conduit can be discharged either into the clarified liquid launder 7' or into the thickened product launder 10', or may be divided between launders 7' and 10' while keeping the conduit 1' full of moving liquid under pressure and thus preventing the entrance of air into said conduit. The conduit 1' is shown as having a downward grade in the direction of flow, said downward grade being necessary in the type of construction shown if the clarified liquid is to flow in the launders 5', 5' in the same direction as the moving stream; if the conduit 1' be given an upward grade in the direction of flow, the launders 5', 5' will deliver the clarified liquid at the opposite end of the apparatus. The launder 9' for thickened product can of course be given a grade or pitch in either or both directions to secure delivery at either end or at any intermediate point. It will of course be understood that the clarified liquid issuing through 4', 4' can be conveyed by any type of pipe or conduit to any desired point of delivery, the open launders 5', 5' being a convenient means when the conduit is a closed wooden pipe of the type shown by the drawings.

When the moving stream is passed through a closed conduit under pressure, the conduit may be horizontal, inclined in the direction of flow or against the direction of flow. It thus becomes possible to effect thickening and clarification with delivery of the products with minimum loss of head.

I am aware that trough settlers and classifiers, and pipe classifiers are not new but my invention differs in method and apparatus from those heretofore used, by maintaining a velocity of flow sufficient to prevent banking, packing or accumulation of materials on the bottom of the conduit, by keeping all of the materials moving continuously, and in removing the lowermost layer of moving thickened product simultaneously with the formation of such thickened layer; also in removing clarified liquid from the upper part of the conduit continuously and simultaneously and further, in that by such continuous and simultaneous removal of these two products the volume of flowing materials is reduced thereby decreasing the velocity of the moving stream, thus facilitating thickening and clarification by sedimentation of the smaller and lighter particles of solid matter, and further in that the removal of thickened product and of clarified liquid is effected automatically and continuously without the aid or assistance of mechanical moving parts, the introduction of hydraulic classifying jets or other devices in common use in classifiers of the trough or pipe type.

The thickened product produced by my invention is not a classified product, and to a limited extent only is it a concentrated product, because it contains particles of all the various sizes and weights present in the pulp or material treated.

As the apparatus for carrying out my invention can be constructed in a great variety of forms, I do not limit myself to the particular types or dimensions shown by the drawings, which are intended diagrammatically to represent the operation of the process and apparatus typical of that which may be employed in such operation.

Having described my invention, I claim:—

1. A method for treating fluid mixtures of liquids and comminuted solids heavier than said liquid and substantially insoluble therein, which consists in causing a mixture of the described type to flow in a substantially quiescent stream; in permitting portions of said solids to settle by gravitation towards and into the lower portion of said flowing stream, thus producing a thickening of the mixture in the lower portion of said flowing stream; in continuously removing thickened mixture from said lower portion of said moving stream, whereby the volume of said flowing stream is progressively decreased by the removal of the thickened product forming in said lower portion, thus permitting additional quantities of said solids to settle by gravitation into the lower portion of the remainder of said stream; in continuing said thickening and said removal until the desired quantity of thickened product is removed; in simultaneously removing from the upper portion of said flowing stream liquid from which most of said solids have settled and in continuing said removal from the upper portion of the remainder of said stream, until clarification of a sufficient part of said liquid and the thickening of a sufficient part of said mixture is effected.

2. A method for thickening mixtures of liquid and comminuted solids heavier than said liquid and substantially insoluble therein and for clarifying the liquid constituent of such mixtures, which consists in providing a body of such mixture of substantially uniform depth and the length of which is materially greater than its depth; in imparting a substantially quiescent movement of longitudinal translation to said body, whereby gravitational settlement downwardly of the particles of said solids towards the lower part of said body may proceed during said translation with simultaneous upward movement of liquid expelled from the lower part of said body by said solid particles settling therein; in removing during said translation the thickened product accumulating in the lower part of said moving body and in simultaneously removing clarified liquid accumulating in the upper part of said body; whereby the said body during said motion of translation is progressively reduced in its vertical dimension or depth, thereby reducing the distance said solid particles must fall, and the vertical distance liquid expelled from the lower part of said body must rise, in thickening a part of said mixture and clarifying a part of said liquid, thus reducing the time required for gravitational thickening and clarification.

3. A method for thickening mixtures of liquid and comminuted solids heavier than said liquid and substantially insoluble therein, in which thickening and clarification are effected by gravitational settling of the particles of said solids during the translation of said mixture as a flowing stream, which consists in reducing the depth of said mixture during and simultaneously with the translation of said flowing stream and with the settling of the said solids, by removing thickened mixture from the lower part of said body and by simultaneously removing clarified liquid from the upper part of said body.

4. Apparatus for treating fluid mixtures of liquid and comminuted solids heavier than said liquid and substantially insoluble therein, comprising in combination a conduit adapted to permit the movement therethrough of a substantially quiescent flowing stream of a mixture of the described type; means for imparting to said stream a velocity sufficient to keep the particles of said solids adjacent to the lower part of said conduit continuously moving with said stream; means for discharging from the lower part of said conduit material from the lower portion of said moving mixture of liquid and solids, said means being substantially co-extensive with the operative length of said conduit, thus permitting additional quantities of said solids to gravitate to the lower part of said conduit and into the lower part of the remainder of said moving stream; means providing for the discharge from the upper portion of said conduit of liquid from which said solids have settled by gravitational sedimentation, said means being substantially co-extensive with the operative length of said conduit and means for separately conveying away the thickened product and the clarified liquid thus removed from said conduit.

Signed at Philadelphia, Pa., this 21st day of July, 1925.

HENRY M. CHANCE.